United States Patent
Hoffnagle et al.

(10) Patent No.: US 6,879,448 B2
(45) Date of Patent: Apr. 12, 2005

(54) APPARATUS FOR ACHROMATIZING OPTICAL BEAMS

(75) Inventors: John Allen Hoffnagle, San Jose, CA (US); Carl Michael Jefferson, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/609,237

(22) Filed: Jun. 26, 2003

(65) Prior Publication Data

US 2004/0264007 A1 Dec. 30, 2004

(51) Int. Cl.[7] .................................................. G02B 9/00
(52) U.S. Cl. ........................................ 359/754; 359/784
(58) Field of Search ........................ 359/754, 784–785, 359/794–797

(56) References Cited

U.S. PATENT DOCUMENTS

| | | | |
|---|---|---|---|
| 4,902,100 A | 2/1990 | Reynolds et al. | 359/15 |
| 4,961,195 A | 10/1990 | Skupsky et al. | 372/31 |
| 5,048,029 A | 9/1991 | Skupsky et al. | 372/26 |
| 5,162,929 A | 11/1992 | Roddy et al. | 359/17 |
| 5,557,692 A | 9/1996 | Pan et al. | 385/11 |
| 5,589,982 A | 12/1996 | Faklis et al. | 359/565 |
| 6,014,260 A | 1/2000 | Godard et al. | 359/619 |
| 6,038,076 A | 3/2000 | Bouzid et al. | 359/640 |
| 6,295,168 B1 | 9/2001 | Hoffnagle et al. | 359/708 |
| 6,487,022 B1 | 11/2002 | Okorogu | 359/642 |

OTHER PUBLICATIONS

S. Zhang et al., "Analysis and Design of Broadband Grating Couplers," IEEE Journal of Quantum Electronics, vol. 29, No. 11, Nov. 1993, pp. 2813–2824.

J.A. Hoffnagle et al., "Design and performance of a refractive optical system that converts a Gaussian to a flattop beam," Applied Optics, vol. 39, No. 30, Oct. 20, 2000, pp. 5488–5499.

Coufal et al., "System for Converting Optical Beams to Collimated Flat–top Beams," U.S. Appl. No. 2003/0053221 A1, Mar. 20, 2003, U.S. Appl. No. 09/917,370.

*Primary Examiner*—Jordan M. Schwartz
*Assistant Examiner*—Jessica Stulz
(74) *Attorney, Agent, or Firm*—Daniel E. Johnson

(57) ABSTRACT

Optical devices achromatize the output from a highly efficient refractive laser beam reshaper, thereby allowing collimated, diffraction limited flat-top laser beams to be generated over a wide spectral interval, e.g., over 200 nm in the visible. While the beam reshaper may utilize refractive aspheric lenses, the achromatizers use cost effective spherical refractive elements.

38 Claims, 17 Drawing Sheets

APPARATUS FOR ACHROMATIZING OPTICAL BEAMS

TECHNICAL FIELD

The present invention relates to the field of optics. More particularly, the present invention relates to an optical system whose output is a multi-frequency beam that has a substantially uniform intensity profile and whose frequency components have respective wavefronts that are substantially independent of frequency.

BACKGROUND

Lasers emitting collimated beams of coherent light have many applications in optical science and technology, including lithography, spectroscopy, communications and display technology. Due to fundamental properties of light propagation in optical resonators, most lasers emit beams having a light intensity that is extremely inhomogeneous. Specifically, the light intensity of an emitted laser beam generally follows a Gaussian distribution $$I(r) = (2P/\pi w^2) e^{-2r^2/w^2}, \quad (1)$$

where $I(r)$ denotes the optical power per unit area measured at a distance r from the axis of the beam, P denotes the total power of the beam, and w is the beam waist parameter, which sets the length scale over which the optical intensity declines from its maximum value to zero. The same distribution also describes, to a good approximation, the intensity profile of a beam that emerges from a single-mode optical fiber, such as is used extensively in the optical industry for conveying light.

For many applications, it is desirable that some area of interest be illuminated as uniformly as possible. For example, optical lithography, which is used to fabricate microelectronic devices, requires that the light fluence over an entire exposed region conform to tight tolerances. Laser users, therefore, frequently encounter the problem of transforming a beam having a Gaussian intensity profile to an output beam having optical intensity that is substantially uniform, e.g., a so-called flat-top profile having uniform intensity over a circular or rectangular region.

Many solutions have been proposed for transforming a Gaussian beam to a flat-top beam. Apparatuses and methods for accomplishing this are disclosed in Applicants' application Ser. No. 09/917,370 titled "System for converting optical beams to collimated flat-top beams" filed Jul. 27, 2001, which issued as U.S. Pat. No. 6,654,183 on Nov. 25, 2003, and in Applicants' U.S. Pat. No. 6,295,168 titled "Refractive optical beam that converts a laser beam to a collimated flat-top beam" issued Sep. 25, 2001, both of which are hereby incorporated by reference. These references present designs that use aspheric optical elements to convert essentially all (99.7%) of the incident optical power of a non-uniform beam into a flat-top beam having greater than 70% of the optical power with less than 5% RMS (root mean square) variation. The edges of the reshaped beam are preferably rolled off in a controlled manner, thereby allowing the beam to propagate without the intensity aberrations that would otherwise arise from diffraction effects due to hard edges. Although the low dispersion glass (silica) used in these designs produces an intensity profile in the output pupil which is essentially uniform from wavelengths of 257 nm to greater than 1.5 microns, the combined dispersion of the two elements causes the output beam wavefront to converge or diverge (i.e., become uncollimated) as the wavelength varies from the nominal design value.

Accordingly, optical designs and components for producing flat-top, achromatic output over a wide wavelength interval would be of great benefit to the optics community.

SUMMARY OF THE INVENTION

This need is satisfied by the optical prescriptions disclosed herein. The term "optical" is used in the broad sense to include electromagnetic radiation anywhere from the deep ultraviolet to the near infrared. The prescriptions and associated methods herein are designed to correct wavelength sensitive wavefront error, thereby allowing uniform flat-top beam profiles to be created whose collimated wavefront is diffraction limited over wavelength intervals up to and greater than 200 nm.

One embodiment of the invention is an optical device for achromatizing an input optical beam that includes axially symmetric beam components of different frequencies that span a spectral interval of at least 100 nm, in which the axially symmetric beam components have respective wavefronts that differ from a uniform plane wave as a function of frequency, the wavefronts having respective root mean square (RMS) differences from the plane wave including a maximum RMS wavefront difference $D_{in}$. The device includes a first refractive optical element for receiving the input optical beam and at least one additional refractive optical element, with these optical elements being aligned along a common optical axis. The optical elements include surfaces that provide frequency dependent wavefront phase correction to the axially symmetric beam components, so that the input optical beam, upon propagating through the optical elements, is transformed into an output optical beam that includes axially symmetric beam components having wavefronts whose maximum root mean square (RMS) wavefront difference $D_{out}$ within the 100 nm spectral interval is less than the wavefront difference $D_{in}$, so that $D_{in}$ is at least 5 times $D_{out}$ (or even at least 10 times $D_{out}$). The surfaces preferably provide wavefront phase correction to axially symmetric beam components that have flat-top intensity profiles; some or all of these surfaces are preferably spherical, thereby facilitating their fabrication. In a preferred embodiment, the optical elements are configured so that, upon receiving an input optical beam that includes axially symmetric beam components having respective central intensity portions that together define more than 70% of the total power of the input beam, the axially symmetric input beam components are transformed by the optical elements into respective output beam components having substantially the same uniform intensity profile. Further, the optical elements may be configured so that, when the output beam components include respective central intensity portions, the intensity profiles of the output beam components deviate from each other by no more than 5% over their central intensity portions. In a preferred embodiment, the optical elements are configured so that each of the axially symmetric output beam components has an RMS wavefront difference from the plane wave of less than about 0.06 waves (and more preferably 0.03 waves) across a 200 nm spectral interval in the visible portion of the spectrum. In a preferred embodiment of the invention, the spectral interval in question includes 150 nm in the visible portion of the spectrum; more preferably, this spectral interval includes that portion of the visible spectrum extending from 450 nm to 650 nm. The device may include no more than 2 elements that provide wavefront correction, or alternatively, no more than 3 elements or no more than 4 elements that provide wavefront correction. The optical device may further comprise a beam reshaper that receives optical input having frequency components that span a spectral interval of at least 100 nm and that have respective axially symmetric, non-uniform intensity profiles, with the beam reshaper transforming the optical input into a substantially flat-top beam that serves as the input optical beam for the optical device.

Another embodiment of the invention is an optical device that includes a beam reshaper, a first refractive optical element, and at least one additional refractive element, all of which are aligned along a common optical axis. The beam reshaper receives an input beam having frequency components that span a spectral interval of at least 100 nm and that have respective axially symmetric, non-uniform intensity profiles. The reshaper includes optical components that transform the input beam into a substantially flat-top beam. The first refractive element and said at least one additional refractive element have surfaces that introduce respective wavefront phase shifts into the beam's frequency components, so that the input optical beam, upon propagating through the device, is converted into a substantially achromatic output optical beam whose frequency components have a substantially flat-top intensity profile. The beam reshaper may include aspheric optical elements for converting a Gaussian input beam into a beam having a substantially flat-top intensity profile.

Yet another embodiment of the invention is an optical device for receiving an input beam that includes axially symmetric beam components of different frequencies that span a spectral interval of at least 100 nm, in which the axially symmetric beam components have non-uniform intensity profiles. The optical device generates a substantially achromatic output optical beam and includes a first group of optical elements that reshapes the axially symmetric beam components into respective flat-top beams. The optical device also includes a second group of optical elements in optical alignment with the first group of optical elements, with the second group of elements changing the wavefront of the axially symmetric beam components, so that the input beam, upon passing through the first group and the second group of optical elements, is converted into an output beam that is substantially achromatic over said at least 100 nm spectral interval. The first group may include aspheric optical elements for converting a Gaussian input beam into a beam having a substantially flat-top intensity profile. The second group of optical elements may be configured so that the output beam has a maximum RMS wavefront difference from a uniform plane wave of less than about 0.06 waves (or even less than 0.03 waves) across a 200 nm spectral interval, such as the spectral interval that extends from 450 nm to 650 nm.

DETAILED DESCRIPTION OF THE INVENTION

Figure 1:
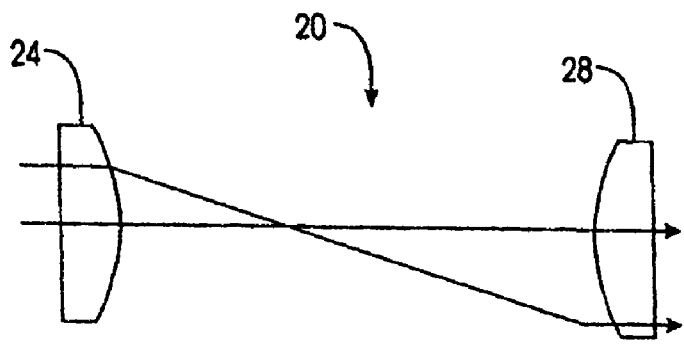
FIG. 1 is a schematic view of a (prior art) Keplerian aspheric apodizer for generating a flat-top beam, whose optical prescription is given by Table 1 and eq. (2).

FIG. 1 shows an apodizer 20 that includes two aspherical components 24 and 28, such as that taught in U.S. Pat. No. 6,295,168. The corresponding optical prescription (for fused silica) is given by Table 1, which presents the coefficients for the power series of the sag ("z") for the formula:

$$z = \Sigma_i \alpha_{2i} r^{2i} \qquad (2)$$

The sag represents the deviation from a plano surface as a function of radial distance (r) from the symmetry axis of the lens. Thus, eq. (2) may be regarded as a description of the surface of the lens in cylindrical coordinates. By convention, the lens surface passes through the origin of the coordinate system. For Table 1 and Table 2 (see below), the dimensions are expressed in mm, and each of the lenses of Tables 1 and 2 has a thickness of 5 mm. The separation between the aspheric surfaces is nominally 150 mm. (A separation of 150 mm corresponds to a design wavelength of 532 nm for Table 1 and 546 nm for Table 2.)

The apodizer 20 coverts an input beam having a Gaussian profile to an output beam whose intensity profile is substantially uniform, e.g., a flat-top beam. The apodizer 20 or reshaper accommodates 99.7% of the incident laser power, and has an entrance pupil of 8.11 mm. The intensity remapping is performed by the first lens 24, while the beam is recollimated by the second lens 28. The shape of the first lens 24 is designed so that it has a radially varying magnification that redistributes the incident Gaussian laser beam power onto the aspheric surface of the second lens 28 according to the intended radial reshaping function. The second aspheric lens 28 then adjusts the optical phase of the laser beam at each radius to re-collimate it with zero net optical phase difference across the exit pupil.

Figure 2:
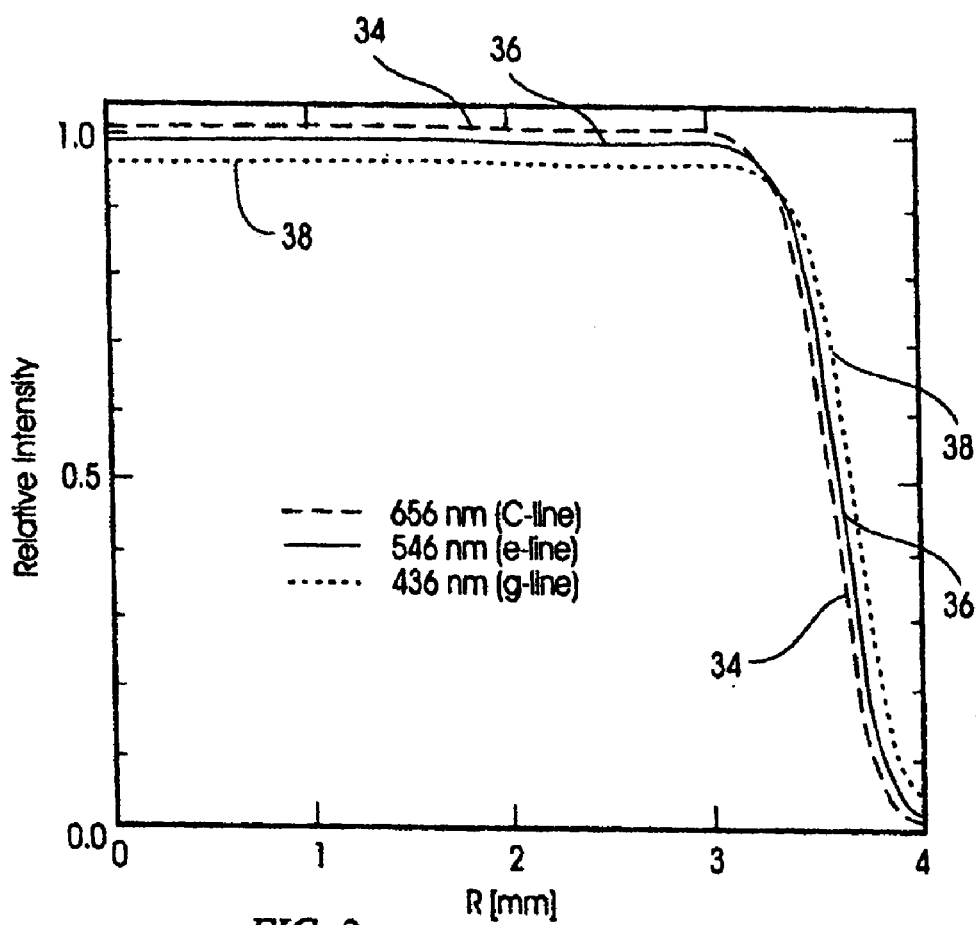
FIG. 2 shows the output intensity distribution from the apodizer of FIG. 1 as a function of radius (distance from the optical axis) for different wavelengths in the visible portion of the spectrum.

The transformation produced by the apodizer 20 is shown in FIG. 2, in which the numerals 34, 36, and 38 are used to identify curves showing relative intensity as a function of radius (i.e., distance from the optical axis) at wavelengths in the red (656 nm), green (546 nm—the design wavelength), and blue (436 nm) portions of the spectrum, respectively. The radial mapping of the incident beam profile to the exit pupil is only weakly affected by the dispersion of the first lens 24. This means that the reshaped beam profile changes only slightly over several hundred nanometers of wavelength, as indicated in FIG. 2. The changes in relative intensity at different wavelengths are due to the redistribution of the incident power over the area defined by the small changes in effective flat-top beam diameter at the output aspheric lens 28.

Figure 3:
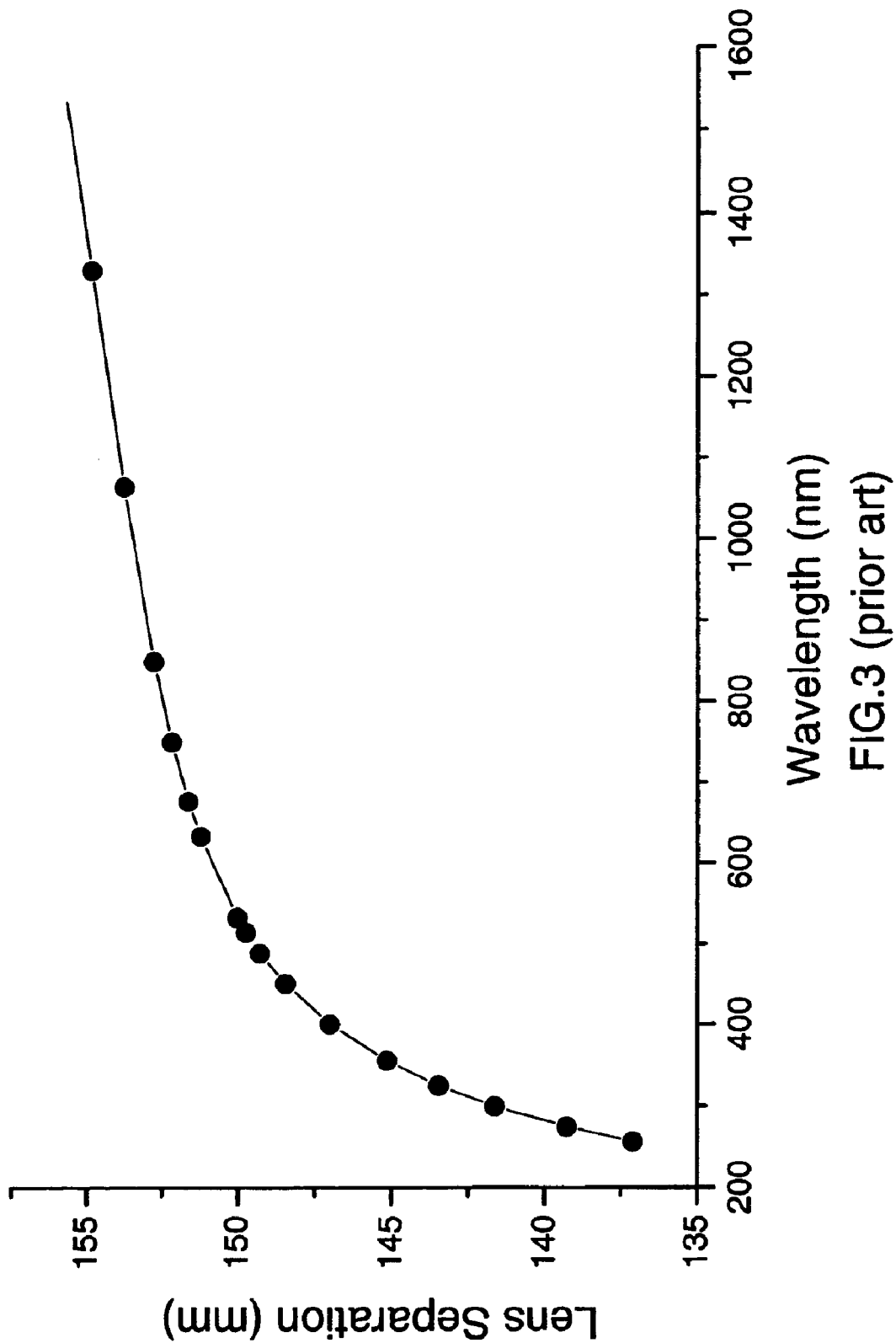
FIG. 3 shows the spacing between the optical elements of FIG. 1 that is required to produce collimated output for a given wavelength.

The primary effect of the dispersion of the aspheric elements in the reshaper is to cause a loss of collimation. If the spacing between the two optical elements 24 and 28 is adjusted, the reshaper 20 can be made to produce a collimated flat-top optical beam at any wavelength from 250 nm to more than 1.5 microns by appropriately selecting the spacing between these two elements. FIG. 3 shows the relationship between the design wavelength and the separation between the optical elements 24 and 28.

Figure 4:
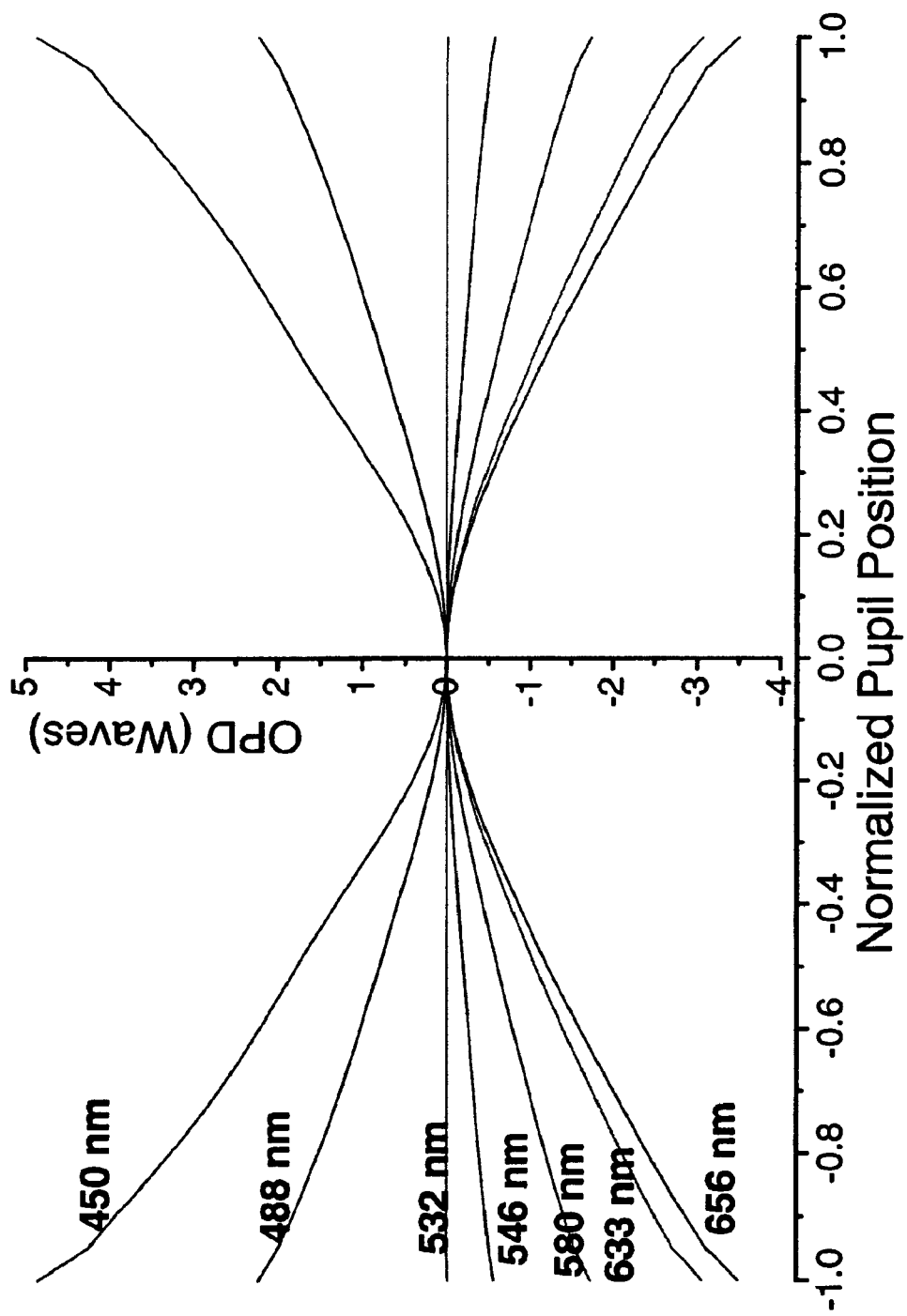
FIG. 4 is the calculated optical path difference (OPD) fan plot for the apodizer of FIG. 1, in which the lens separation is 150 mm, corresponding to a design wavelength of 532 nm.
Figure 5:
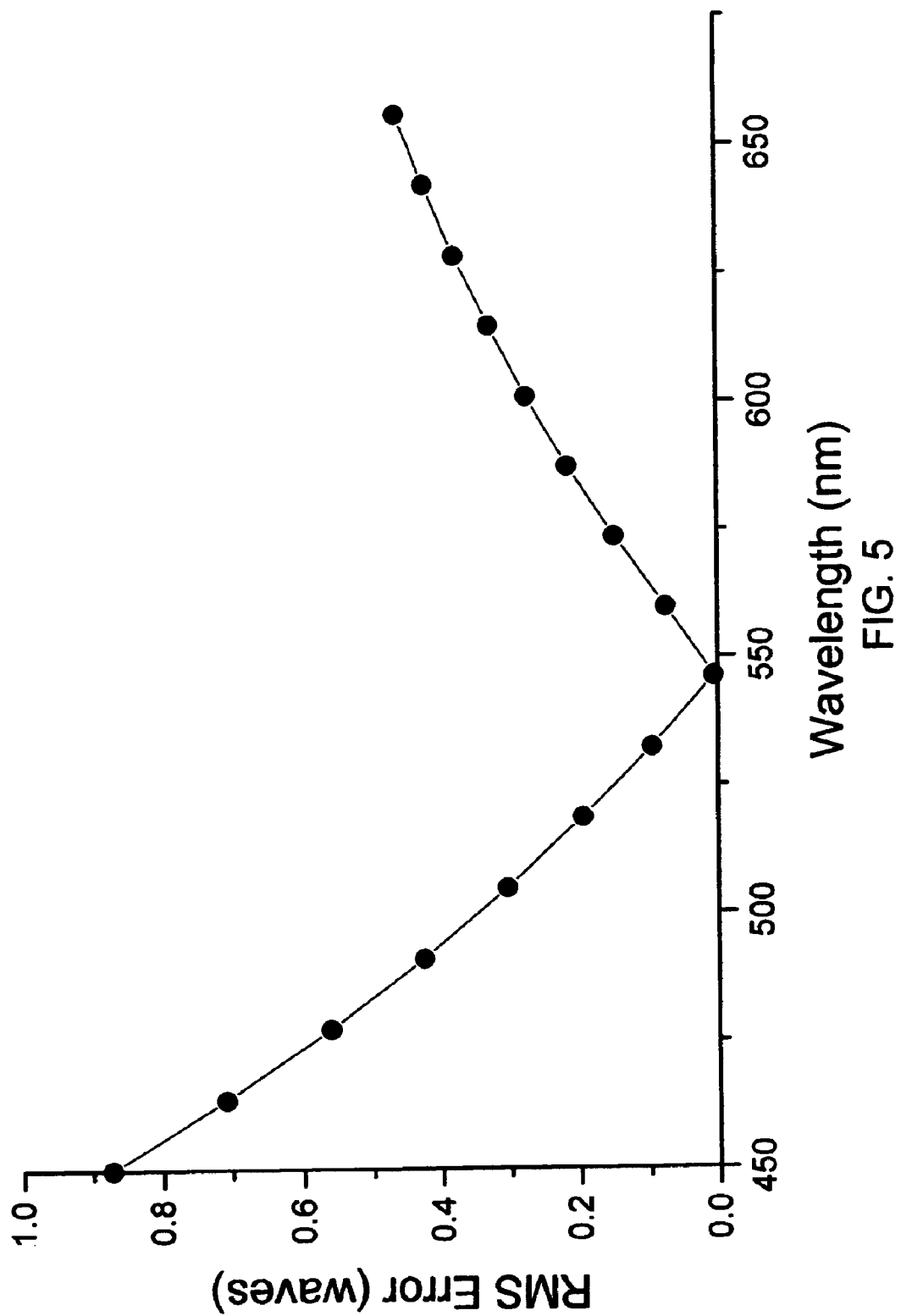
FIGS. 5 and 6 show RMS error plots (in waves) for the optical prescriptions given by Tables 1 and 2, respectively.
Figure 6:
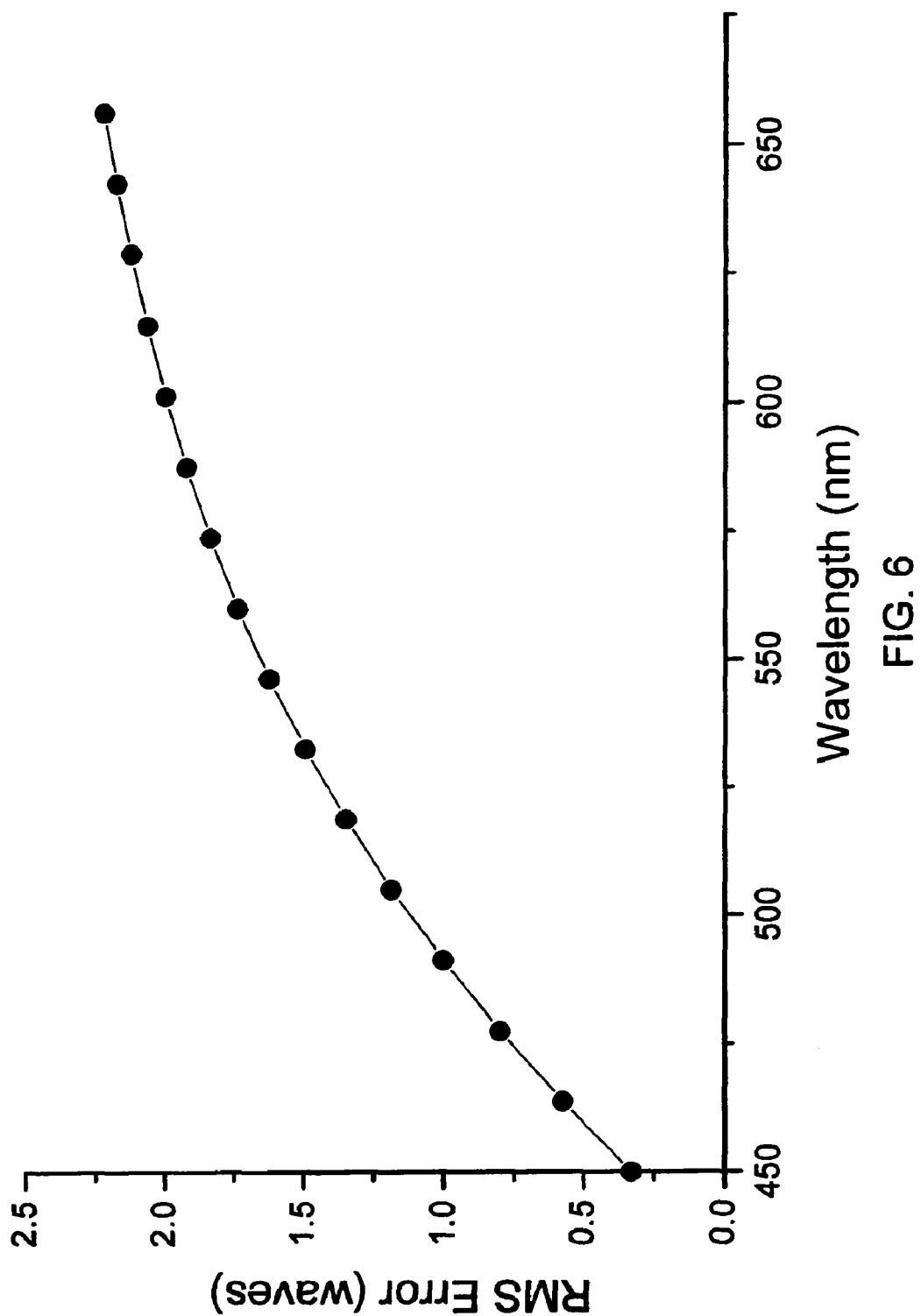

For a given, fixed spacing between the two optical elements 24 and 28, the collimation will change by many waves over a wide spectral interval. This effect is illustrated in FIG. 4, in which the Optical Path Difference fan plot for the reshaper 20 (for a fixed spacing of 150 mm) is shown for wavelengths ranging from 450 nm to 656 nm, as a function of normalized pupil position given by distance from the optical axis. Over this wavelength range, the maximum OPD (at the output pupil) varies from 0.01 waves at the design wavelength of 532 nm, to almost 5 waves at 450 nm. (In FIG. 4 and elsewhere herein, "waves" are calculated with respect to the wavelength for which the error is quoted, rather than with respect to a fixed reference wavelength.) This chromatic loss of collimation renders the reshaper 20 unusable in many broadband applications, such as with very short pulse lasers or multi-spectral illumination. For such applications, the optical path length of the optical system should not vary substantially over broad wavelength ranges. RMS error plots in waves for the optical output from the lens systems of Tables 1 and 2 are shown in FIGS. 5 and 6, respectively. In FIG. 6, the separation between the reshaper lenses is 148 mm (instead of the nominal design value of 150 mm at a wavelength of 532 nm.)

Figure 7:
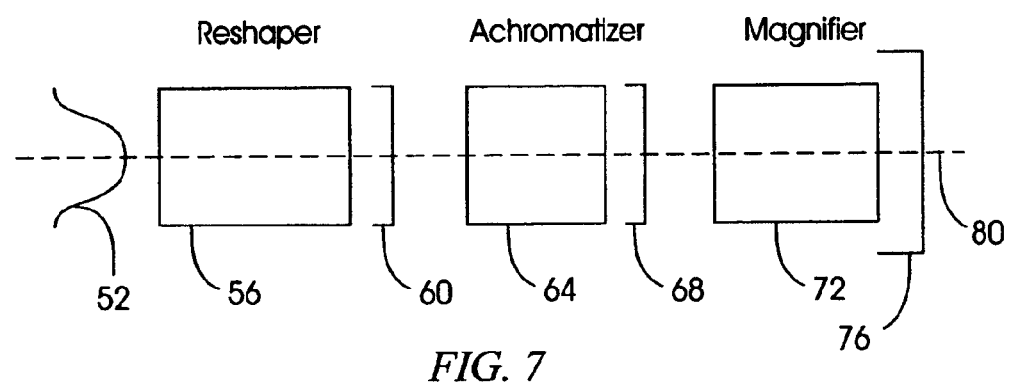
FIG. 7 shows a schematic configuration of optical elements illustrating one embodiment of the invention.

FIG. 7 schematically illustrates a preferred embodiment of the invention, in which a Gaussian or other non-uniform but radially symmetric input beam 52 is directed onto a reshaper 56 (such as the apodizer 20 shown in FIG. 1). The result is a flat-top beam 60 that suffers from the collimation problems described above in connection with FIGS. 3 and 4. The beam 60 is input into an achromatizer 64 (described in greater detail below), which acts as an external compensator with respect to the reshaper 56, thereby producing a flat-top beam 68 that enjoys good collimation across a wide spectral interval. This beam 68 may be used in conjunction with a magnifying (de-magnifying) element 72 designed to expand (or de-magnify) the beam 68 to produce a wider (or narrower) beam 76 while preserving this good achromaticity as a function of frequency. The optical elements 56, 64, and 72, as well as the beams 52, 60, 68, and 76, are aligned along a common optical axis 80. Alternatively, an achromatizer 90, reshaper 94, and magnifying (focusing) element 98 may be arranged in the order shown in FIG. 8, along a common optical axis 104.

Figure 7A:
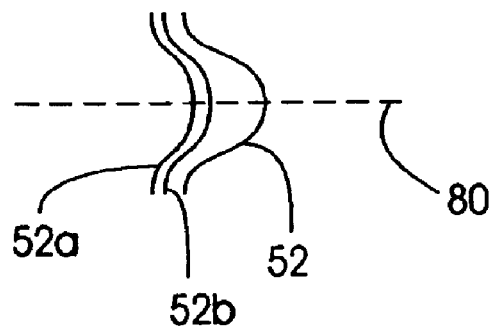
FIG. 7A shows that the input beam of FIG. 7 includes spectral components having intensity profiles similar to that of the (aggregate) input beam.
Figure 7B:
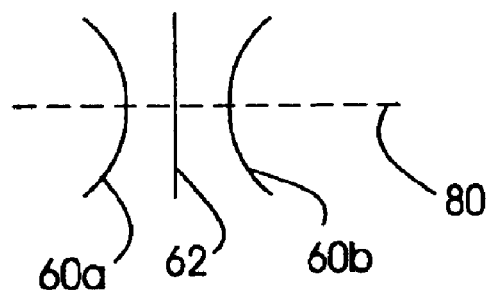
FIG. 7B shows non-achromatized wavefronts of the flat-top beam of FIG. 7 prior to passing through the achromatizer.
Figure 7C:
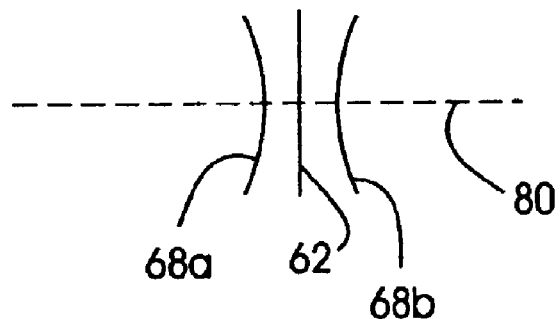
FIG. 7C shows color-corrected wavefronts that have passed through the achromatizer of FIG. 7.

Certain aspects of the embodiment of FIG. 7 are now shown in greater detail. FIG. 7A illustrates how the Gaussian input beam 52 of FIG. 7 is made up of spectral components 52*a*, 52*b* (only two components are shown for clarity) that have intensity profiles substantially similar to each other and to that of the aggregate beam 52. FIG. 7B illustrates wavefronts, or surfaces of constant optical phase, of the flat-top beam 68. A uniform plane wave 62 is shown and may correspond to the design frequency of the optical apparatus shown in FIG. 7. Wavefronts 60*a* and 60*b* correspond to spherical wavefronts that are diverging and converging, respectively. Wavefronts are associated with every wavelength (frequency) of the beam 60, and in general, these wavefronts will differ from the plane wave 62 as a function of frequency. FIG. 7C illustrates the effect of the achromatizer 64 on the flat-top beam 60. Wavefronts 68*a* and 68*b* have frequencies corresponding to those of 60*a* and 60*b*, respectively, but are now relatively well achromatized, as suggested by their larger radii of curvature with respect to those of 60*a* and 60*b*. (The plane wave 62 can be viewed as a spherical wave with an infinite radius of curvature.)

Figure 8:
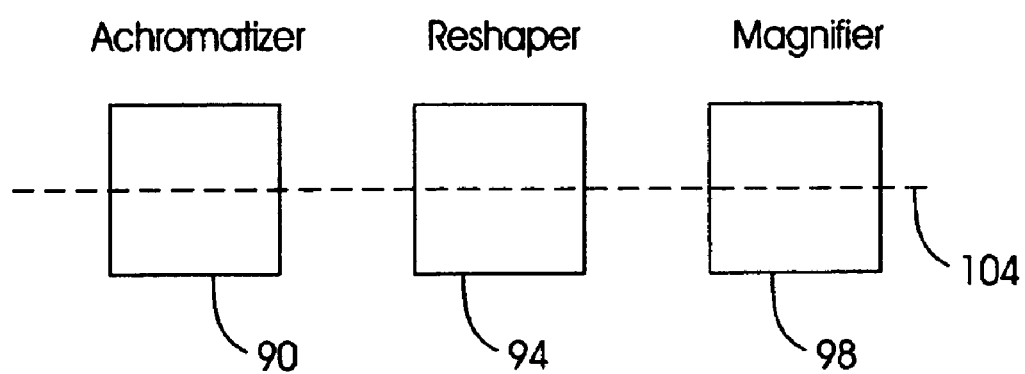
FIG. 8 shows a schematic configuration of optical elements illustrating an alternative embodiment of the invention.

The achromatizers disclosed herein, when used as external compensators for receiving optical output from a reshaper (such as the reshaper 56 of FIG. 7), are sensitive to alignment with the flat-top beam 60; accordingly, they are preferably located at the exit pupil of the reshaper 56, although in principle the correction optics may be placed at the entrance of the reshaper, as shown in FIG. 8. The positive and negative lenses of the embodiments disclosed herein compensate for wavefront curvature across a wide spectral interval, thereby leading to good achromatic performance.

The achromatizers disclosed herein were designed with the assistance of the Zemax optical design program from Focus Software, Inc., San Diego, Calif. For these designs, the reshaper 56 was taken to be either the silica aspheric optics of Table 1 or the S-FPL53 aspheric optics of Table 2, which presents the corresponding coefficients for the sag function of eq. (2). (S-FPL53 is a low dispersion optical glass having an index of refraction $N_d$=1.43875 and an Abbe number $V_d$=95.) In order to use simple achromatizing optics, the dispersion of any elements in the reshaper should be reduced as much as possible, since with greater dispersion, it becomes much harder to find simple solutions to the achromatization problem, and more and more optical elements are necessary. The separation between the aspherical components 24 and 28 was allowed to vary slightly from the nominal design spacing of 150 mm to facilitate the design. Additional optical elements needed to realize the achromatic corrections were input, in which radii, thicknesses, and glass types were varied to find optimum solutions. The separation between the output of the reshaper and the input of the achromatizer was 10 mm. The merit function was set up to reduce the OPD, with additional constraints on ray heights at several wavelengths. Ray heights were specified not only at the output of the achromatizer, but also at a point several meters downstream from it, as the reshaped optical intensity profile downstream is extremely sensitive to variations in the slopes of the sag functions of the optical elements that would otherwise yield nominal "diffraction limited" performance.

Figure 11A:
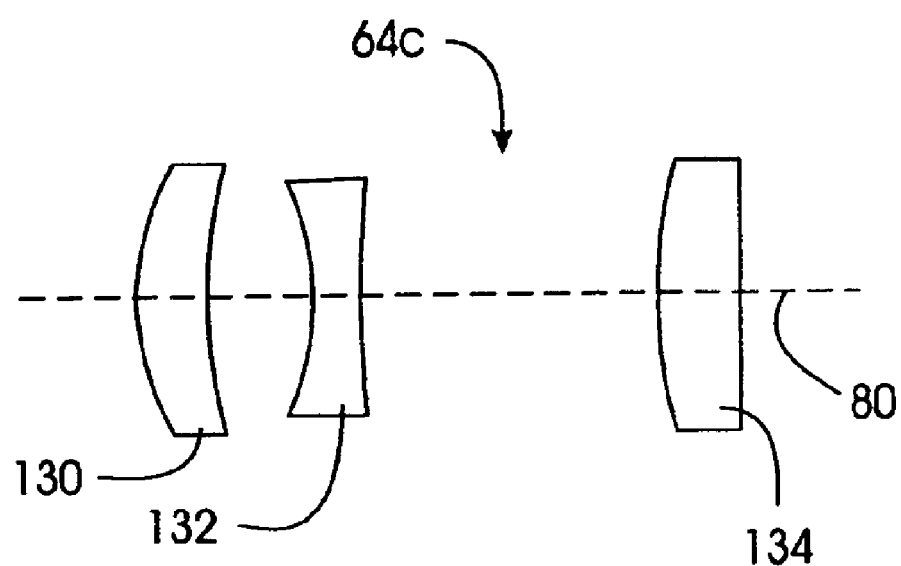
FIG. 11A is an air spaced triplet achromatizer of the present invention, with optical performance for this achromatizer being shown in FIG. 11B.
Figure 12A:
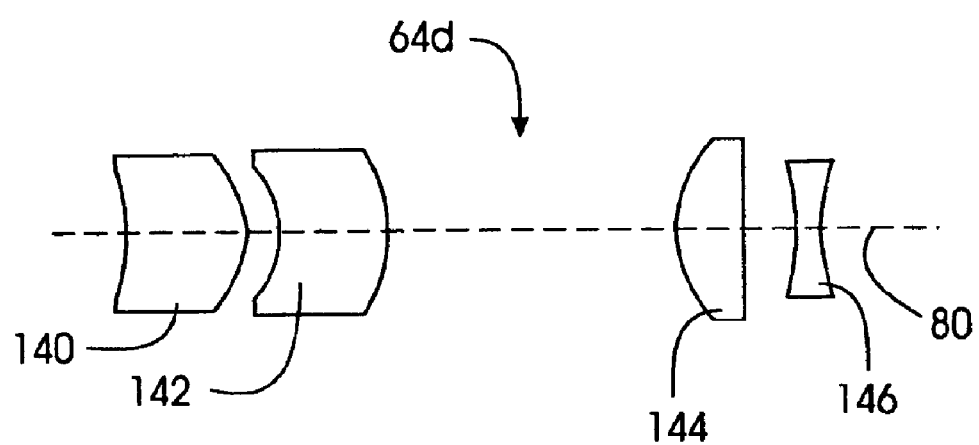
FIG. 12A is an air spaced quartet achromatizer of the present invention, with optical performance for this achromatizer being shown in FIG. 12B.

Various achromatizers are now described, including a cemented doublet (FIG. 9A), a cemented triplet (FIG. 10A), an air spaced triplet (FIG. 11A), and an air spaced quartet (FIG. 12A). These achromatizers are designed to be used in an optical configuration like that of FIG. 7 and may be made using techniques known to those skilled in the art. All these designs produce diffraction limited wavefronts over a 200 nanometer wavelength interval; the design wavelengths cover the visible range of the spectrum, varying from 450 nm to 656.

Figure 9A:
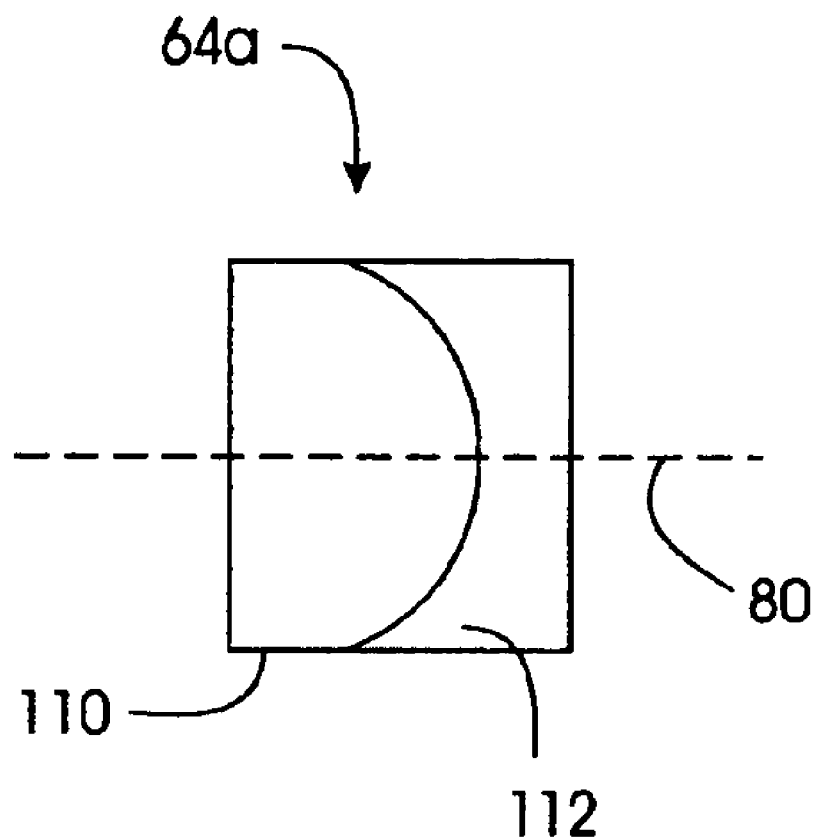
FIG. 9A is a cemented doublet achromatizer of the present invention, with optical performance for this achromatizer being shown in FIG. 9B.
Figure 9B:
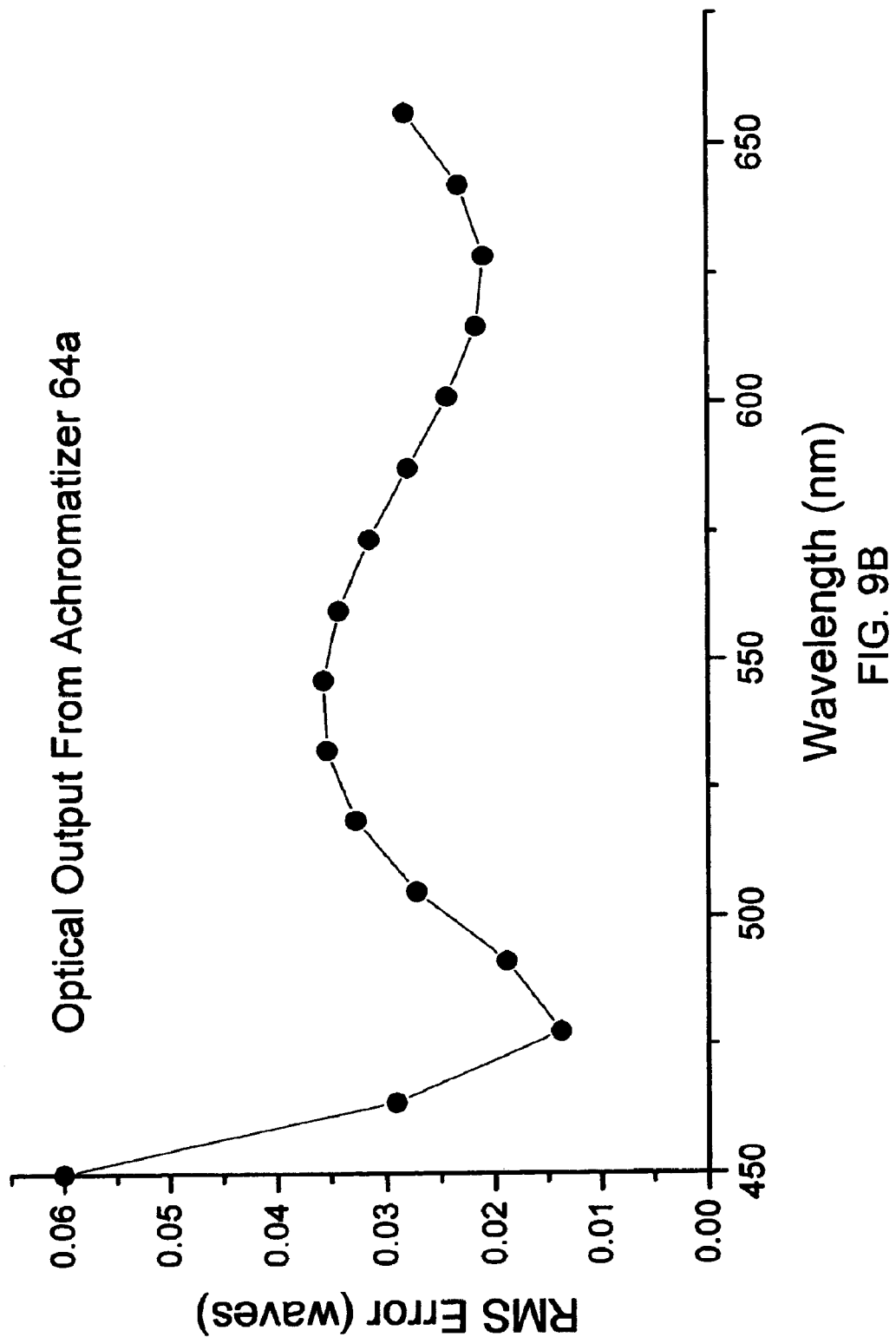

FIG. 9A shows an achromatizer 64a designed to be used with optical output from the reshaper of Table 2, in which the separation between the reshaper lenses is selected to be 150 mm. In this and in the other achromatizer designs, light from the corresponding reshaper enters on the left. The achromatizer 64a includes two spherical elements 110, 112, and the corresponding optical prescription is shown in Table 3. In accordance with convention, in Table 3 (and in the other prescriptions) the radii are for the surfaces going from left to right, and the thicknesses are for the glass types going from left to right. As shown in FIG. 9B, this design produces output that is better than diffraction limited from 450 to 656 nm. For the performance data of FIG. 9B (and FIGS. 10B, 11B, and 12B below), the achromatizer is separated from the corresponding reshaper by 10 mm (i.e., the surface-to-surface separation or air spacing is 10 mm), and the input to the reshaper is Gaussian with a beam waist w of 2.366 mm. In particular, the RMS wavefront error of the beam from the achromatizer 64a is less than about 0.06 waves across the entire spectral interval, which is better than diffraction-limited performance of 0.072 waves at 532 nm; as used herein, the RMS wavefront error is a measure of the extent to which a given wavefront at a particular wavelength (or frequency) differs from a plane wave (such as the plane wave corresponding to the design wavelength) and is measured in waves of that particular wavelength. Over the spectral interval 450–550 nm, the RMS wavefront error of the output from the achromatizer 64a is less than about 0.06 waves, and over the spectral interval 550–650 nm, the RMS wavefront error is less than 0.04 waves. By comparing FIGS. 5 and 9B, it is evident that the achromatizer 64a decreases the maximum RMS wavefront error in the spectral interval 450–550 nm from about 0.88 waves to a maximum in this interval of about 0.06 waves (by greater than a factor of 10); the maximum RMS wavefront error in the spectral interval 550–650 nm is decreased from about 0.5 waves to a maximum in this interval of about 0.035 waves (by greater than a factor of 10); and the maximum RMS wavefront error in the spectral interval 450–650 nm is decreased from about 0.88 waves to a maximum in this interval of about 0.06 waves (by greater than a factor of 10). The input aperture is 8.11 mm.

Figure 10A:
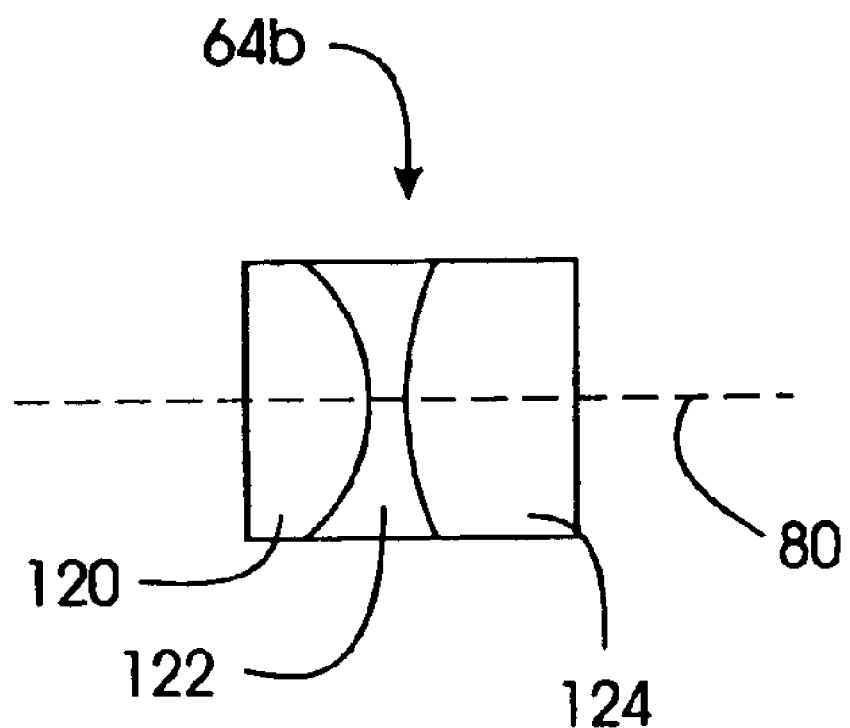
FIG. 10A is a cemented triplet achromatizer of the present invention, with optical performance for this achromatizer being shown in FIG. 10B.
Figure 10B:
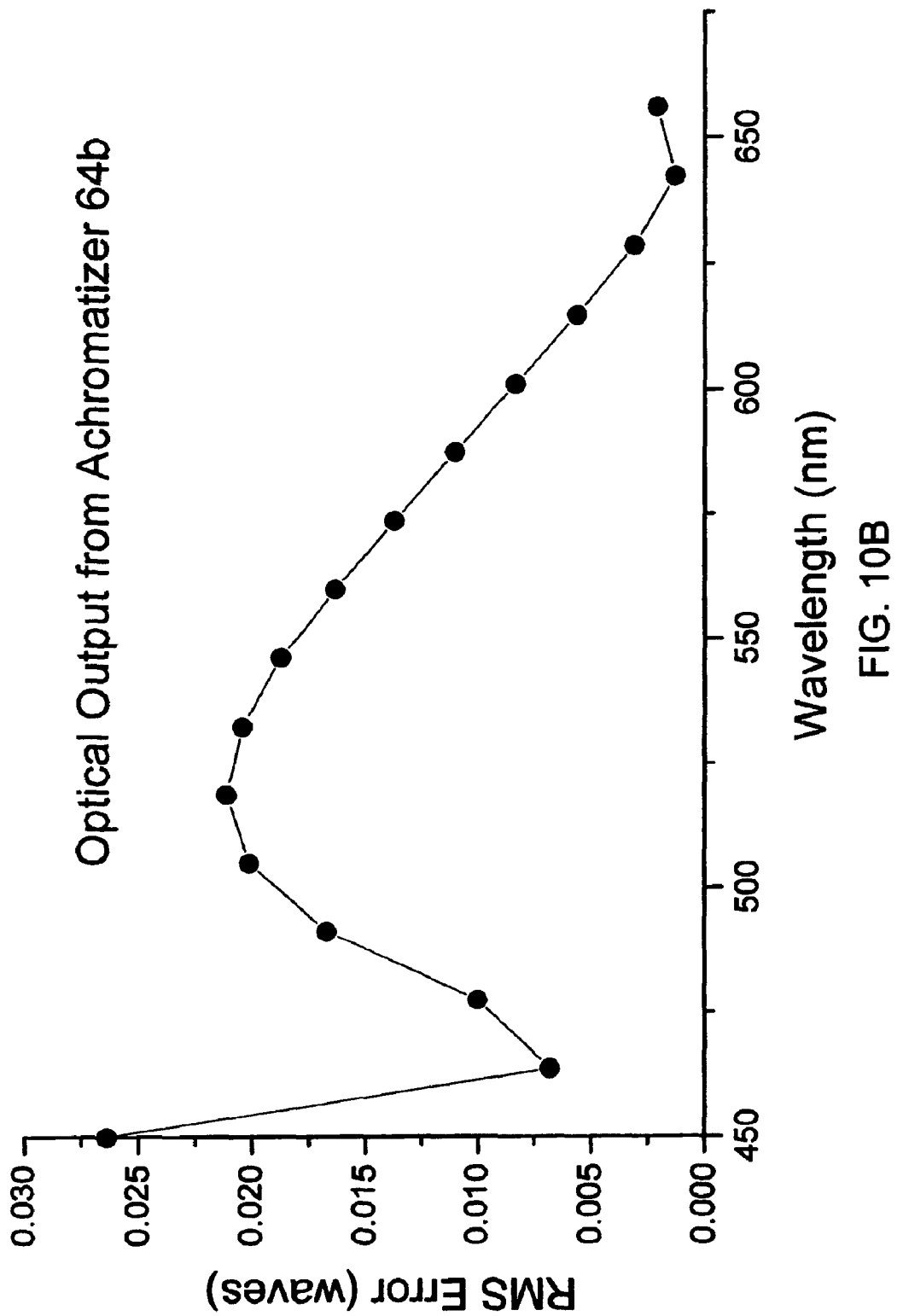

FIG. 10A shows an achromatizer 64b designed to be used with the fused silica reshaper of Table 1, in which the separation between the reshaper lenses is selected to be 148.0 mm. (For the achromatizers of FIGS. 10 and 12, which are designed to be used with the fused silica reshapers, the spacing between the 2 lenses of the reshaper, which provides optical input to the achromatizer, was varied slightly from the nominal design value of 150 mm to facilitate the design of the achromatizer.) S-FPL53 has limited transmission for wavelengths much shorter than 350 nm. If good performance is desired in the UV, a good glass choice for the aspheric pair is fused silica. Although having excellent optical properties in the UV, fused silica has a much lower Abbe number ($V_d$=67.82) than S-FPL53, so the amount of chromatic compensation needed to achromatize the system will increase, and a doublet does not have the required degrees of freedom. A cemented triplet, can, however, be designed that will give the desired diffraction limited OPD. One such triplet design is shown in FIG. 10A, in which the achromatizer 64b includes spherical elements 120, 122, and 124. The corresponding optical design for this prescription is given in Table 4. As shown in FIG. 10B, the achromatizer 64b produces output that is better than diffraction limited from 450 to 656 nm, when the optical input to the achromatizer 64b is the output from the reshaper of Table 1. In particular, the RMS wavefront error of the output from the achromatizer 64b is less than 0.030 waves across the wavelength interval shown, and the peak-to-peak OPD is 0.125 waves. Over the spectral interval 450–550 nm, the RMS wavefront error of the output from the achromatizer 64b is less than 0.030 waves, and over the spectral interval 550–650 nm, the RMS wavefront error is less than 0.02 waves. By comparing FIGS. 6 and 10B, it is evident that the achromatizer 64b decreases the maximum RMS wavefront error in the spectral interval 450–550 nm from about 1.7 waves to a maximum in this interval of about 0.027 waves (by greater than a factor of 50); the maximum RMS wavefront error in the spectral interval 550–650 nm is decreased from about 2.2 waves to a maximum in this interval of about 0.017 waves (by greater than a factor of 100); and the maximum RMS wavefront error in the spectral interval 450–650 nm is decreased from about 2.2 waves to a maximum in this interval of about 0.027 waves (by greater than a factor of 70). The input aperture is 8.11 mm.

Figure 11B:
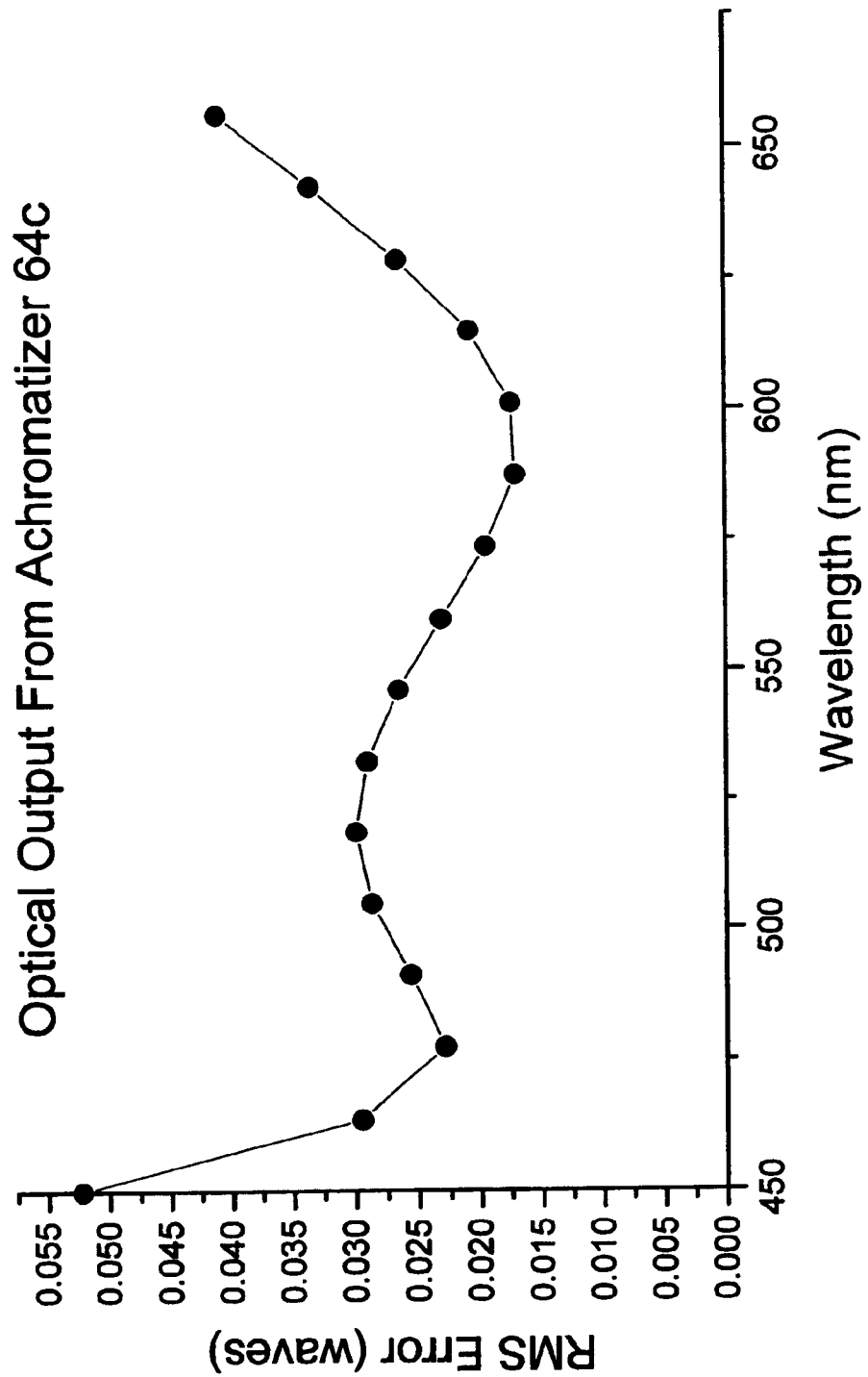

An air spaced triplet achromatizer 64c to be used with the S-FPL53 reshaper of Table 2 (in which the separation between the reshaper lenses is selected to be 150 mm) is shown in FIG. 11A, and includes spherical elements 130, 132, 134. The corresponding optical design for this prescription is given in Table 5. An advantage of an air spaced triplet is that it allows for transforming the size of the output intensity profile, and for some applications, it is desirable to scale the size of the output beam. The design of FIG. 11A, however, is a unity magnification system. As shown in FIG. 11B, the achromatizer 64c produces output that is better than diffraction limited from 450 to 656 nm. In particular, the RMS wavefront error of the output from the achromatizer 64c is less than 0.06 waves across the entire spectral interval, and the peak to peak OPD is 0.125 waves. Over the spectral interval 450–550 nm, the RMS wavefront error of the output from the achromatizer 64c is less than 0.06 waves, and over the spectral interval 550–650 nm, the RMS wavefront error is less than 0.05 waves. By comparing FIGS. 5 and 11B, it is evident that the achromatizer 64c decreases the maximum RMS wavefront error in the spectral interval 450–550 nm from about 0.88 waves to a maximum in this interval of about 0.052 waves (by greater than a factor of 15); the maximum RMS wavefront error in the spectral interval 550–650 nm is decreased from about 0.5 waves to a maximum in this interval of about 0.042 waves (by greater than a factor of 10); and the maximum RMS wavefront error in the spectral interval 450–650 nm is decreased from about 0.88 waves to a maximum in this interval of about 0.052 waves (by greater than a factor of 15). The input aperture is 8.11 mm.

Figure 12B:
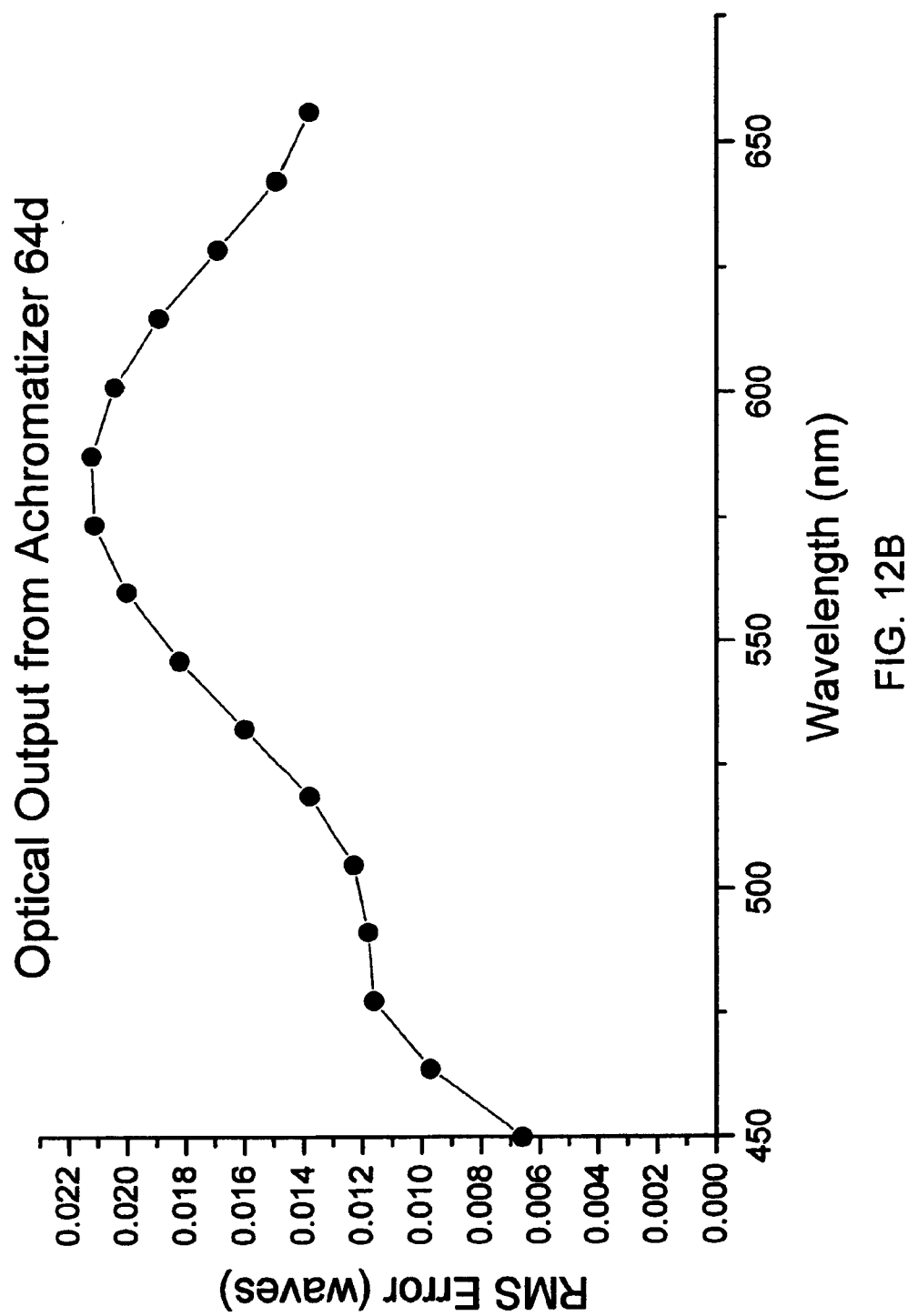

An air spaced quartet achromatizer 64d to be used with the fused silica reshaper of Table 1 (in which the separation between the reshaper lenses is selected to be 148.2 mm) is shown in FIG. 12A and includes spherical elements 140, 142, 144, and 146. The corresponding optical design for this prescription is given in Table 6. As shown in FIG. 12B, the achromatizer 64d produces output that is better than diffraction limited from 450 to 656 nm. In particular, the RMS wavefront error of the output from the achromatizer 64d is less than 0.022 waves over the wavelength range of 450 to 656 nm when used with the reshaper of Table 1. Over the spectral interval 450–550 nm, the RMS wavefront error of the output from the achromatizer 64d is less than 0.020 waves, and over the spectral interval 550–650 nm, the RMS wavefront error is less than 0.022 waves. By comparing FIGS. 6 and 12B, it is evident that the achromatizer 64d decreases the maximum RMS wavefront error in the spectral interval 450–550 nm from about 1.7 waves to a maximum in this interval of about 0.019 waves (by greater than a factor of 80); the maximum RMS wavefront error in the spectral interval 550–650 nm is decreased from about 2.2 waves to a maximum in this interval of about 0.022 waves (by greater than a factor of 80); and the maximum RMS wavefront error in the spectral interval 450–650 nm is decreased from about 2.2 waves to a maximum in this interval of about 0.022 waves (by greater than a factor of 80). The input aperture is 8.11 mm.

Figure 13:
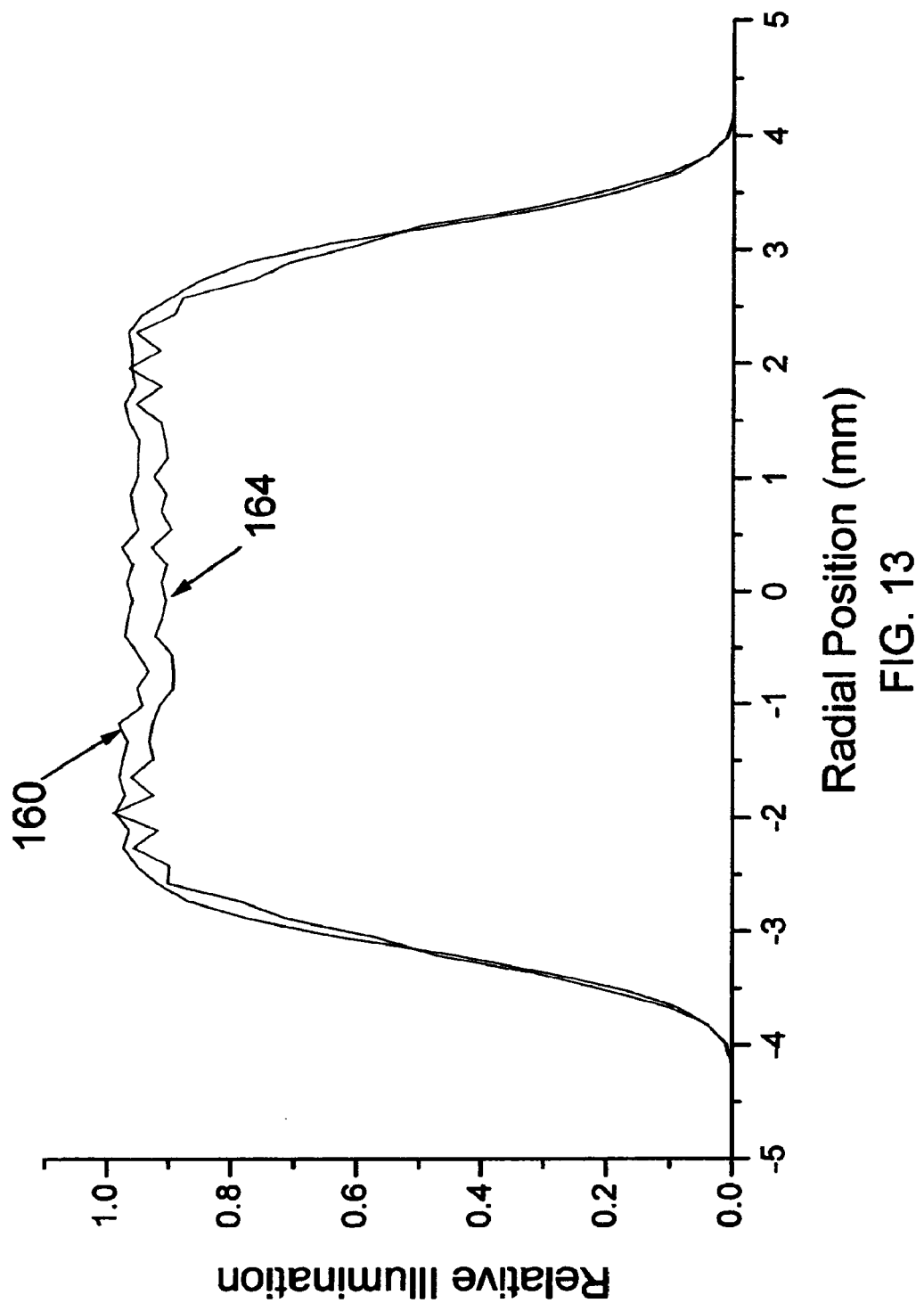
FIG. 13 illustrates how the intensity profile of a flat-top optical beam is not significantly changed as it propagates through and away an achromatizer of the present invention.

The achromatizers of the present invention do not significantly affect the intensity profile of optical beams passing through them. FIG. 13 shows a curve 160 that represents the intensity profile (as a function of distance from the optical axis) for 532 nm flat-top optical output from the reshaper of Table 1, in which the input beam to this reshaper is Gaussian with a beam waist of 2.366 mm. After passing through the cemented triplet achromatizer 64b shown in FIG. 10A, the beam at the output side of the achromatizer 64b has an intensity profile (not shown) that is virtually indistinguishable from the curve 160. The intensity profile of this beam 200 mm downstream from the achromatizer 64b is shown by curve 164 and is found to be substantially unchanged as a result of this propagation. In particular, the full width at half maximum (FWHM) of the curves 160 and 164 differ by less than 5%. Intensity profile plots for other wavelengths (e.g., 450 nm and 656 nm) are strikingly similar to the 532 nm plots of FIG. 13. The achromatizers 64a, 64c, and 64d have intensity profile behavior similar to that shown in FIG. 13 for achromatizer 64b.

Other achromatizers may be designed that have either better or worse performance depending on their number of elements, the optical material used, the desired wavelength range, and so on. From a design perspective, one prefers to use a set of optical elements whose defocus as a function of wavelength compensates for the refractive power introduced by the glass(es) of the reshaper lenses. In order to avoid changes in the flat-top beam diameter as a function of wavelength, it is advantageous to place the achromatizer in close proximity with the output aperture of the reshaper.

It should be noted that very small figure errors in the reshaper optics, which contribute very little to the net OPD, can have a substantial and distressing impact on the flatness of the resulting reshaped optical profile. These errors usually manifest themselves in the far field of the reshaper, becoming noticeable over perhaps a meter or so (for well figured and polished reshaper optical surfaces). These artifacts are geometrical in nature, and are not due to diffraction. The same considerations apply to the achromatizing optics, whose aberrations can, in the far field, create unwanted deviations of the radial intensity profile from the intended one. Thus, it is advantageous to choose the number of elements of the achromatizer (and, if possible, the glasses of the aspherical reshaper lenses) such that aberrations are kept to a suitably small level. Such a level will typically correspond to a much lower OPD than one might think justified by a "diffraction limited" rule of thumb.

An intensity profile near the reshaping/achromatizing optics that has an acceptable flatness may be re-imaged at other points in the optical system using imaging relay optics. Because the numerical aperture of the propagating flat-top beam is very small (it is collimated over a range of wavelengths), the requirements on the relay optics are fairly relaxed. This approach may also be used to change the size of the optical beam to the desired value. Either conventional single lens relay optics or afocal telescope systems can be used. The afocal telescope approach has several advantages, especially if the telescope is Keplerian. A Keplerian telescope has an external focal plane on each side of the telescope, and these focal planes relay the optical rays entering them exactly to the opposite plane, modified only by the magnification of the telescope. Thus, magnifying the reshaped laser beam with a Keplerian telescope reduces the effects of residual reshaper/achromatizer figure errors and aberrations downstream by reducing the resulting ray pointing angle errors (which redistribute the optical power radially) by the inverse of the magnification.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

TABLE 1

|  | First lens | Second lens |
|---|---|---|
| alpha_2 = | −2.137505E−02 | 1.094181E−02 |
| alpha_4 = | 6.354780E−04 | 3.380964E−05 |
| alpha_6 = | −2.658736E−05 | 5.320188E−06 |
| alpha_8 = | −9.637925E−07 | −6.552913E−07 |
| alpha_10 = | 2.307553E−07 | 3.556669E−08 |
| alpha_12 = | −1.553485E−08 | 5.469871E−09 |
| alpha_14 = | 5.043081E−10 | −5.732156E−10 |
| alpha_16 = | −6.637931E−12 | 1.405458E−11 |

TABLE 2

|  | First lens | Second lens |
|---|---|---|
| alpha_2 = | −2.240493E−02 | 1.147164E−02 |
| alpha_4 = | 6.880355E−04 | 1.797478E−05 |
| alpha_6 = | −3.795033E−05 | 1.488491E−05 |
| alpha_8 = | 1.178546E−06 | −3.057996E−06 |
| alpha_10 = | −1.200582E−08 | 3.604682E−07 |
| alpha_12 = | −1.480068E−10 | −1.847298E−08 |
| alpha_14 = | 0.0 | 3.380208E−10 |
| alpha_16 = | 0.0 | 0.0 |

TABLE 3

| Radius (mm) | Thickness (mm) | Glass Type |
|---|---|---|
| −243.5499 | 5.94955 | S-BAL22 |
| −4.829133 | 1.999995 | BAL14 |
| −236.037 |  |  |

TABLE 4

| Radius (mm) | Thickness (mm) | Glass |
|---|---|---|
| −171.4204 | 4.38137 | LAK21 |
| −5.121821 | 1.499976 | C38–42 |
| 14.60141 | 6.000017 | S-TIH13 |
| 199.333 |  |  |

TABLE 5

| Radius (mm) | Thickness (mm) | Glass |
|---|---|---|
| 10.3826 | 2.814383 | NSL3 |
| 26.25061 | 2.954694 |  |

TABLE 5-continued

| Radius (mm) | Thickness (mm) | Glass |
|---|---|---|
| −15.37484 | 1.999998 | BPH40 |
| 46.50757 | 10.71822 | |
| 38.96138 | 2.302944 | PSK53A |
| Infinity | | |

TABLE 6

| Radius (mm) | Thickness (mm) | Glass |
|---|---|---|
| −15.52178 | 6.000084 | S-NPH1 |
| −10.60849 | 2.034933 | |
| −8.808905 | 5.408229 | S-LAL10 |
| −19.26865 | 16.00001 | |
| 10.41951 | 3.697516 | C04–64 |
| −197.273 | 2.444028 | |
| −23.24242 | 1.499971 | S-TIH53 |
| 20.31206 | | |

What is claimed is:

1. An optical device for achromatizing an input optical beam that includes axially symmetric beam components of different frequencies that span a spectral interval of at least 100 nm, wherein the axially symmetric beam components have respective wavefronts that differ from a uniform plane wave as a function of frequency, the wavefronts having respective root mean square (RMS) differences from the plane wave including a maximum RMS wavefront difference $D_{in}$, the device comprising:
a first refractive optical element for receiving the input optical beam; and
at least one additional refractive optical element, wherein:
said first and said additional elements are aligned along an optical axis common to all said elements; and
said first and said additional optical elements include surfaces that provide frequency dependent wavefront phase correction to the axially symmetric beam components, so that the input optical beam, upon propagating through said elements, is transformed into an output optical beam that includes axially symmetric beam components having wavefronts whose maximum root mean square (RMS) wavefront difference $D_{out}$ within said 100 nm spectral interval is less than the wavefront difference $D_{in}$, so that $D_{in}$ is at least 5 times $D_{out}$.

2. The device of claim 1, said surfaces providing wavefront phase correction to axially symmetric beam components that have flat-top intensity profiles.

3. The device of claim 1, wherein said optical elements are non-focusing at a given wavelength.

4. The device of claim 1, wherein said optical elements are configured so that, upon receiving an input optical beam that includes axially symmetric beam components having respective central intensity portions that together define more than 70% of the total power of the input beam, the axially symmetric input beam components are transformed by said optical elements into respective output beam components having substantially the same uniform intensity profile.

5. The device of claim 4, wherein said optical elements are configured so that, when the output beam components include respective central intensity portions, the intensity profiles of the output beam components deviate from each other by no more than 5% over their central intensity portions.

6. The device of claim 1, wherein said optical elements are configured so that each of the axially symmetric output beam components has an RMS wavefront difference from the plane wave of less than about 0.06 waves across a 200 nm spectral interval in the visible portion of the spectrum.

7. The device of claim 1, wherein said optical elements are configured so that each of the axially symmetric output beam components has an RMS wavefront difference from the plane wave of less than about 0.03 waves across a 200 nm spectral interval in the visible portion of the spectrum.

8. The device of claim 1, wherein said spectral interval includes 150 nm in the visible portion of the spectrum.

9. The device of claim 1, wherein said spectral interval includes that portion of the visible spectrum extending from 450 nm to 650 nm.

10. The device of claim 1, said optical elements including no more than 2 elements that provide wavefront correction.

11. The device of claim 1, said optical elements including no more than 3 elements that provide wavefront correction.

12. The device of claim 1, said optical elements including no more than 4 elements that provide wavefront correction.

13. The device of claim 1, wherein said surfaces are selected so that $D_{in}$ is at least 10 times $D_{out}$.

14. The device of claim 1, further comprising a beam reshaper that receives optical input having frequency components that span a spectral interval of at least 100 nm and that have respective axially symmetric, non-uniform intensity profiles, said beam reshaper transforming the optical input into a substantially flat-top beam that serves as the input optical beam for said device.

15. The device of claim 1, wherein said surfaces include spherical surfaces.

16. The device of claim 1, wherein all of said surfaces are spherical.

17. An optical device, comprising:
a beam reshaper for receiving an input beam having frequency components that span a spectral interval of at least 100 nm and that have respective axially symmetric, non-uniform intensity profiles, said beam reshaper having optical components selected to transform the input beam into a substantially flat-top beam;
a first refractive optical element; and
at least one additional refractive optical element; wherein:
said beam reshaper, said first refractive element, and said at least one additional refractive element are aligned along a common optical axis; and
said optical elements have surfaces that introduce respective wavefront phase shifts into the frequency components, so that the input optical beam, upon propagating through said device, is converted into a substantially achromatic output optical beam whose frequency components have a substantially flat-top intensity profile.

18. The device of claim 17, said beam reshaper including aspheric optical elements for converting a Gaussian input beam into a beam having a substantially flat-top intensity profile.

19. The device of claim 17, wherein said optical elements are configured so that each of the axially symmetric output beam components has an RMS wavefront difference from a uniform plane wave of less than about 0.06 waves across a 200 nm spectral interval in the visible portion of the spectrum.

20. The device of claim 17, wherein said optical elements are configured so that each of the axially symmetric output beam components has an RMS wavefront difference from a uniform plane wave of less than about 0.03 waves across a 200 nm spectral interval in the visible portion of the spectrum.

21. The device of claim 17, wherein said spectral interval includes 150 nm in the visible portion of the spectrum.

22. The device of claim 17, wherein said spectral interval includes that portion of the visible spectrum extending from 450 nm to 650 nm.

23. The device of claim 17, said optical elements including no more than 2 elements that provide wavefront correction.

24. The device of claim 17, said optical elements including no more than 3 elements that provide wavefront correction.

25. The device of claim 17, said optical elements including no more than 4 elements that provide wavefront correction.

26. The device of claim 17, wherein said surfaces include spherical surfaces.

27. The device of claim 17, wherein all of said surfaces are spherical.

28. An optical device for receiving an input beam that includes axially symmetric beam components of different frequencies that span a spectral interval of at least 100 nm, the axially symmetric beam components having non-uniform intensity profiles, the optical device generating a substantially achromatic output optical beam, the device comprising:

a first group of optical elements that reshapes the axially symmetric beam components into respective flat-top beams; and a second group of optical elements in optical alignment with said first group of optical elements, said second group of elements changing the wavefront of said axially symmetric beam components, so that the input beam, upon passing through said first group and said second group of optical elements, is converted into an output beam that is substantially achromatic over said at least 100 nm spectral interval.

29. The device of claim 28, said first group including aspheric optical elements for converting a Gaussian input beam into a beam having a substantially flat-top intensity profile.

30. The device of claim 28, wherein said second group of optical elements are configured so that the output beam has a maximum RMS wavefront difference from a uniform plane wave of less than about 0.06 waves across a 200 nm spectral interval.

31. The device of claim 28, wherein said second group of optical elements are configured so that the output beam has a maximum RMS wavefront difference from a uniform plane wave of less than about 0.03 waves across a 200 nm spectral interval in the visible portion of the spectrum.

32. The device of claim 28, wherein said spectral interval includes 150 nm in the visible portion of the spectrum.

33. The device of claim 28, wherein said spectral interval includes that portion of the visible spectrum extending from 450 nm to 650 nm.

34. The device of claim 28, wherein said second group of optical elements includes no more than 2 elements that provide wavefront correction.

35. The device of claim 28, wherein said second group of optical elements includes no more than 3 elements that provide wavefront correction.

36. The device of claim 28, wherein said second group of optical elements includes no more than 4 elements that provide wavefront correction.

37. The device of claim 28, said second group of optical elements including spherical surfaces.

38. The device of claim 37, wherein all the surfaces of said second group of optical elements are spherical.

* * * * *